US011904601B2

(12) United States Patent
Sole et al.

(10) Patent No.: US 11,904,601 B2
(45) Date of Patent: Feb. 20, 2024

(54) CURING APPARATUS

(71) Applicant: HEWLETT-PACKARD DEVELOPMENT COMPANY, L.P., Spring, TX (US)

(72) Inventors: Macia Sole, Sant Cugat del Valles (ES); Xavier Gasso, Sant Cugat del Valles (ES); Francesc Tarrida, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 115 days.

(21) Appl. No.: 17/544,819

(22) Filed: Dec. 7, 2021

(65) Prior Publication Data

US 2022/0088946 A1 Mar. 24, 2022

Related U.S. Application Data

(62) Division of application No. 16/074,387, filed as application No. PCT/EP2016/054716 on Mar. 4, 2016, now abandoned.

(51) Int. Cl.
*B41J 11/00* (2006.01)

(52) U.S. Cl.
CPC ................................ *B41J 11/00222* (2021.01)

(58) Field of Classification Search
None
See application file for complete search history.

(56) References Cited

U.S. PATENT DOCUMENTS 6,681,497 B2 * 1/2004 Bria ...................... F26B 13/104
34/79
7,343,116 B2 3/2008 Seorl et al.
7,386,247 B2 6/2008 Doi
7,468,099 B2 12/2008 Katayama
9,025,990 B2 5/2015 Schlumm et al.
2004/0183879 A1 9/2004 Nakazawa
2011/0109693 A1 5/2011 Ohnishi
(Continued)

FOREIGN PATENT DOCUMENTS

CN 1519112 A 8/2004
CN 101543722 A 9/2009
(Continued)

OTHER PUBLICATIONS

Translation of JP 2014-133398 A. (Year: 2014).*
(Continued)

*Primary Examiner* — Justin Seo

(57) ABSTRACT

In an example, an apparatus includes an air treatment part to reduce the amount of a component comprised in air in the air treatment part and to supply treated air to a curing part, the air treatment part comprising a catalytic oxidizer to oxidize the component. The apparatus also includes the curing part to receive treated air from the air treatment part and to expose an item printed with a printing fluid comprising the component to the received treated air. The apparatus includes an air circulation system to cause the treated air to flow from the air treatment part into the curing part and to cause air from the curing part to flow into the air treatment part.

12 Claims, 5 Drawing Sheets

(56) References Cited

U.S. PATENT DOCUMENTS

| | | | |
|---|---|---|---|
| 2013/0216254 | A1 | 8/2013 | Schlumm et al. |
| 2013/0321542 | A1 | 12/2013 | Velasco et al. |

FOREIGN PATENT DOCUMENTS

| | | | |
|---|---|---|---|
| CN | 103223784 | A | 7/2013 |
| CN | 104364082 | A | 2/2015 |
| CN | 104553317 | A | 4/2015 |
| JP | 56146429 | U | 11/1981 |
| JP | 2009145729 | A | 7/2009 |
| JP | 2011083950 | A | 4/2011 |
| JP | 2012091320 | A | 5/2012 |
| JP | 2012171098 | A | 9/2012 |
| JP | 2013043434 | A | 3/2013 |
| JP | 2013154620 | A | 8/2013 |
| JP | 2014502365 | A | 1/2014 |
| JP | 2014133398 | A | 7/2014 |

OTHER PUBLICATIONS

Aerosol Science & Technology, "Characterization of Laser Printer Nanoparticle and VOC Emissions, Formation Mechanisms, and Strategies to Reduce Airborne Exposures," vol. 45, Issue 9, 2011. [Onnline] http://www.tandfonline.com/doi/abs/10.1080/02786826.2011.580799.

* cited by examiner

CURING APPARATUS

CROSS-REFERENCE TO RELATED APPLICATIONS

The present application is a divisional of U.S. patent application Ser. No. 16/074,387, filed Jul. 31, 2018, which claims priority to PCT Patent Application No. PCT/EP2016/054716, filed Mar. 4, 2016, titled "Curing Apparatus," and are hereby incorporated herein by reference in its entirety.

BACKGROUND

Latex printing fluids exist, in which pigments are encapsulated in a polymer material. The polymer capsules are dispersed in a solvent to form a liquid printing fluid that can be applied to a medium by an inkjet printhead. After a latex printing fluid has been printed onto a medium, heat may be used to evaporate the solvent and fuse the polymer, together with the pigments, into the medium.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
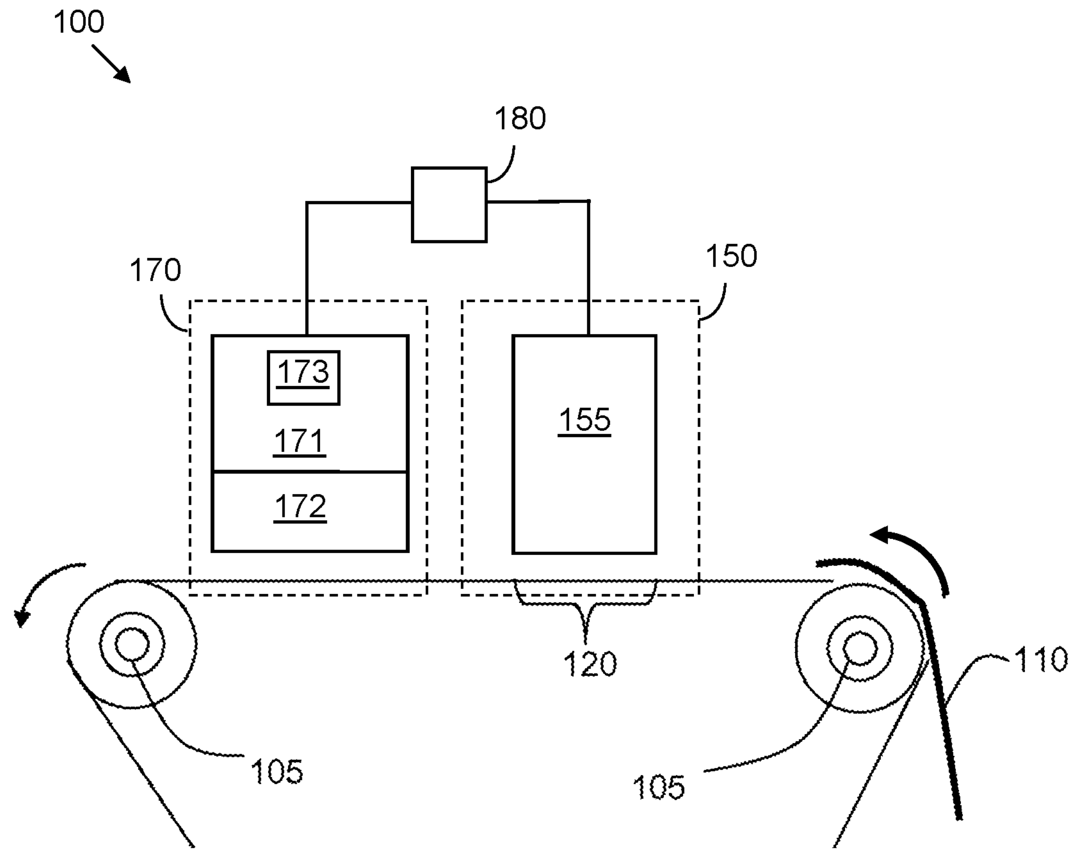
FIG. 1 schematically illustrates a printer according to an example.

In the field of printing technology, a desire exists for providing printing fluids (e.g. inks) that allow for the generation of an image on a printing medium that retains a high image quality over a prolonged period of time, e.g. several years. Potentially interesting types of printing fluids are solvent-based latex printing fluids. Such printing fluids include a latex binder to bind pigments in the printing fluid to the medium after printing.

In order to cure the latex in the printing fluid following printing, the medium carrying the printing fluid is exposed to an elevated temperature, e.g. by blowing hot air at the printed medium. Curing the latex involves evaporating the solvents in the printing fluid from the printed medium. Once enough of the solvents have been removed, the latex fuses together with the pigments into the medium.

However, challenges exist in curing a medium printed with a solvent-based latex printing fluid using hot air. For example, the solvents comprised in the latex printing fluid may have a very low vapor pressure, in which case a very high air temperature is to be used in order for the air to have a significant transport capacity for those solvents, and to give enough energy to the solvents to produce a change of phase. The capacity of a given printing device curing module to evaporate solvents from a printed medium depends on the temperature of operation, the air flow over the printed medium, and the available capacity of the air to remove the solvents (also called the specific solvent concentration of the air).

A curing module of a printing device may comprise, for example, a set of parts of a printing device which together provide the function of curing printing fluid deposited onto a medium by that printing device. In some examples a curing module may be separable from the rest of the printing device, such that it can be provided or replaced independently of any other parts or modules comprised in the printing device. A curing module may comprise a "curing part", which is a region and/or component or set of components comprised in the curing module which may be considered as a functional unit for achieving the function of curing a curable printing fluid (i.e. a latex printing fluid) printed on a printing medium. A curing module may also comprise one or several additional parts which support the operation of the curing part, such as an air treatment part, a control part, and/or an interface part.

Heating ambient air to a sufficiently high temperature uses a significant amount of energy. The energy consumption of a curing module can be reduced by recirculating some of the air that has already passed over the printed medium and mixing it with ambient air before the ambient air is heated, to increase the initial temperature of the ambient air and consequently reduce the amount of heating. However; the recirculated air is saturated with solvents evaporated from the printed medium, so mixing recirculated air with the ambient air increases the specific solvent concentration of the ambient air (i.e. it reduces the capacity of the ambient air to carry solvents). Increasing energy efficiency by recirculating some air therefore reduces the curing efficiency of the curing module.

The curing efficiency can be increased by reducing the specific solvent concentration of the air passing over the printed medium, which in turn can be achieved by of reducing the amount of recirculation, increasing the air flow over the printed medium, and/or increasing the temperature. However; all of these actions increase the energy consumption. Operating a curing module therefore involves a trade-off between curing efficiency and energy efficiency.

Additional challenges may exist, depending on the nature of the solvents comprised in the latex printing fluid. Some solvents, e.g. volatile organic compounds (VOCs) may desirably be prevented from escaping into the environment external to the printing device. Printing devices which use such solvents may therefore include a system for collecting or destroying the evaporated solvent carried by air within the printing device before that air is exhausted from the printing device.

The following disclosure relates to an apparatus, which may be, e.g., a curing module for a printer, which seeks to address some or all of these challenges.

FIG. 1 depicts a printer 100 according to an example. The printer 100 is to feed a printing medium 110 over a print platen 120 in a direction indicated by the arrows over pick-up rollers 105. The rollers 105 are shown by way of non-limiting example. The printer 100 may have any suitable mechanism for transporting the printing medium 110 over the print platen 120. The printing medium 110 may be any medium suitable for receiving a curable printing fluid comprising a component that may be vaporized during a curing stage of a printing process, e.g. a latex printing fluid. Hereinafter the term "printing fluid" should be taken to refer to a curable printing fluid comprising a component that may be vaporized during a curing stage of a printing process.

The printer 100 comprises a printing stage 155. This may be any printing stage suitable for printing a printing fluid on the printing medium 110. For example, the printing stage 155 may comprise an ink jet printhead 155 coupled to a reservoir for containing the printing fluid. The printing stage 155 is controlled by a controller 180.

The printer 100 further comprises a curing stage 170 for curing the printing fluid printed onto the printing medium 110. The curing stage 170 comprises an air treatment part 171, a curing part 172, and an air circulation system 173, which will be described in more detail below. The curing stage 170 is also controlled by the controller 180. The curing stage 170 is to heat the printing medium 110 to a temperature that is sufficient for curing the printing fluid printed on the printing medium, e.g. such that a latex layer is formed on the printing medium 110. In an example, the curing stage 170 is arranged to heat the printing medium to a temperature around 95° C. However; different temperatures may be selected for different media types. The curing stage 170 may heat the printing medium 110 in any suitable way, e.g. by blowing hot air at the printing medium, or by irradiating the printing medium. In an example the curing stage is to direct hot air at the printing medium 110.

The printer 100 may be to feed the printing medium 110 over the print zone in a continuous fashion, or may alternatively be to feed the printing medium 110 over the print zone in a stepwise fashion, wherein the printing medium 110 is for instance temporarily stopped for receiving the printing fluid from the printing stage 155 or for curing the printing fluid by the curing stage 170.

The controller 180 may be implemented in the form of machine-readable instructions executable on a processor such as a central processing unit of the printer 100. The machine-readable instructions may be made available on any suitable computer-readable medium. For example, the machine-readable instructions may be contained on a non-transitory computer-readable storage device.

Figure 2:
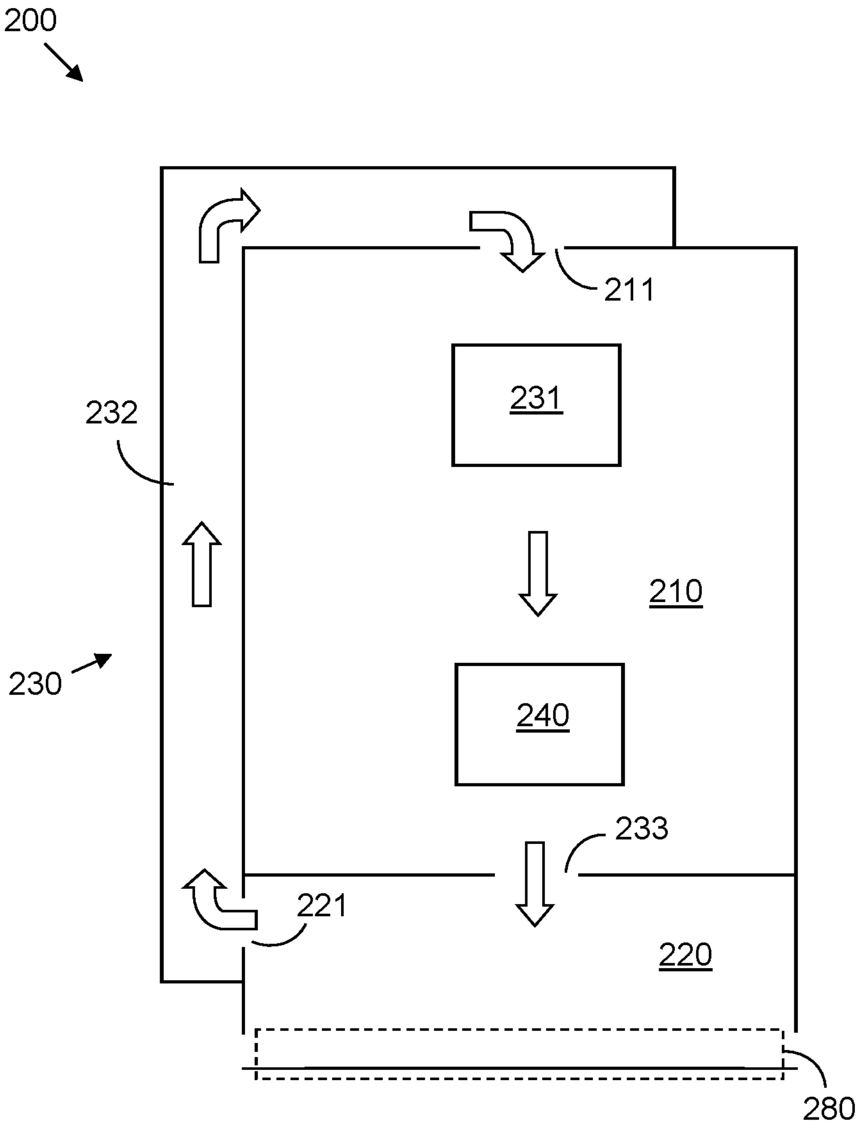
FIG. 2 schematically illustrates an apparatus according to an example.

FIG. 2 depicts an example apparatus 200. The apparatus 200 may be, e.g., a curing module of a printer. The apparatus 200 may, for example, comprise or be comprised in the curing stage 170 of the printer 100.

The apparatus 200 comprises an air treatment part 210 and a curing part 220. The term "air treatment part" is intended to refer to any region and/or component or set of components comprised in an apparatus, which may be considered as a functional unit for achieving the function of reducing the amount of a component comprised in air in the air treatment part. An air treatment part may be considered to have reduced the amount of a component comprised in air in the air treatment part if the amount of the component in air leaving the air treatment part is less than the amount of the component in air entering the air treatment part, as determined by any suitable measure. In some examples an air treatment part may comprise a chamber for containing air to be treated by the air treatment part. In some examples components comprised in an air treatment part may be contiguously located in the apparatus. For example, an air treatment part may comprise an air flow generator (e.g. a fan) which is remote from a main chamber of the air treatment part but is in fluid communication with that chamber, e.g. via ducting.

The air treatment part 210 is to reduce the amount of a component comprised in air in the air treatment part. The component may be a component comprised in a printing fluid. For example, the component may be a solvent vapor. The component may be a volatile compound such as a volatile organic compound (VOC). In some examples the air treatment part 210 reduces the amount of the component using an oxidation process, such as a catalytic oxidation process. To this end, an air cleaning element 240, such as a catalytic oxidizer may be provided in the air treatment part 210. The air treatment part 210 is also to supply treated air to the curing part 220.

The term "curing part" is intended to refer to any region and/or component or set of components comprised in an apparatus, which may be considered as a functional unit for achieving the function of curing a curable printing fluid (i.e. a latex printing fluid) printed on a printing medium. A curing part may be considered to have cured a printing fluid printed on a medium if latex in the printing fluid is unfused when the printing medium enters the curing part, and is at least partly fused when the printing medium leaves the curing part. In some examples a curing part may comprise a chamber for receiving a printing medium and containing the printing medium during the curing process. In some examples components comprised in a curing part may be contiguously located in the apparatus.

The curing part 220 is to receive treated air from the air treatment part and to expose an item printed with a printing fluid comprising the component to the received treated air.

The apparatus 200 further comprises an air circulation system 230. The air circulation system 230 is to cause the treated air to flow from the air treatment part 210 into the curing part 220. The air circulation system 230 is also to cause air from the curing part 220 to flow into the air treatment part 210.

In the illustrated example of FIG. 2 the air treatment part 210 comprises a first chamber, having an air inlet 211, and an air cleaning element 240. The air cleaning element 240 is to reduce the amount of a volatile compound comprised in the air in the first chamber. The air cleaning element 240 may comprise a catalytic oxidizer, e.g. in the form of a reactor chamber containing a catalyst.

The catalyst may be provided in the form of one or several structures (e.g. monoliths, pellets, etc.) coated with a catalytic material (e.g. a material based on Titanium, Palladium, Gold or similar elements). Air to be cleaned may be directed through the reactor chamber such that it contacts the surface of the catalytic structure. Provided the temperature of the air is sufficiently high, and the time spent by the air in contact with the catalytic material is sufficiently long (i.e. at least the permanency time of the catalytic structure), an oxidation reaction will take place within the reactor chamber.

In the case that the component is a VOC, the reaction comprises conversion of the VOC into carbon dioxide ($CO_2$) and water ($H_2O$). This reaction is exothermic, so that heat is generated by the air cleaning element 240. Air leaving the air cleaning element 240 may therefore have a higher temperature than air entering the air cleaning element 240. All of the component contained in the air passing through the air cleaning element may be removed, such that air leaving the air cleaning element contains substantially none of the component. In the case that the component is a VOC, the amount of carbon dioxide and water comprised in air leaving the air cleaning element 240 may be higher than the amount of carbon dioxide and water comprised in air entering the air cleaning element 240.

The catalytic material is selected based on the particular component desired to be removed from the air (e.g. a catalyst material which catalyzes oxidation of VOCs may be used if it is desired to remove one or several species of VOC from the air). The catalytic material may also be selected based on the minimum temperature for the oxidation reaction (i.e. the chemical reaction which removes the component from air) to take place in the presence of the catalyst. The catalytic material may enable Low Temperature Catalytic oxidation. For example, the catalytic material may enable the oxidation reaction to take place at a temperature lower than 200° C. The catalytic material may enable the oxidation reaction to take place at a temperature lower than 100° C. The catalytic material may enable the oxidation reaction to take place at a temperature in the range 60-200° C. Examples in which the oxidation reaction takes place at a relatively low temperature enable the apparatus to be used with a wide range of different types of print media, including types of print media which may be unable to tolerate high temperatures. An example of a low temperature catalyst for VOC oxidation is described in WO 2014/170191.

The catalytic oxidizer may be to expose a predefined surface area of catalytic material to air flowing through the catalytic oxidizer. In such examples, the predefined surface area may be determined in dependence on factors such as the temperature, volume and/or flow rate of air flowing through the catalytic oxidizer during operation of the apparatus. The greater the surface area, the shorter is the minimum time for the air to be contact with the catalytic structure in order for the oxidation reaction to take place. A greater surface area of catalytic material can therefore enable a higher flow rate of air through the air treatment part.

The catalytic oxidizer may be to minimize a pressure drop experienced by air passing through the catalytic oxidizer (e.g. to minimize a difference between the pressure of air exiting the catalytic oxidizer and the pressure of air entering the catalytic oxidizer. The pressure drop can be minimized, e.g., by maximizing the cross-section of an air flow passage through the catalytic oxidizer, as far as is possible within a cleaning element having a size and shape suitable for enabling the cleaning element to be provided within a curing module of a printer. A low pressure drop across the catalytic oxidizer can reduce the power consumed in driving the circulation of air in the apparatus.

In an example the air cleaning element 240 comprises a monolithic catalyst having a honeycomb structure. The honeycomb structure may be formed, e.g., by a ceramic substrate coated with a catalytic material. A honeycomb structure can provide a very high surface area per unit volume compared to other structures, enabling the air cleaning element to be small enough to be provided within a curing module of a printer.

In the illustrated example the curing part 220 comprises a second chamber, which is in fluid communication with the first chamber. In the example the fluid communication between the first chamber and the second chamber is through an opening 233 in a partition separating the first chamber from the second chamber. The second chamber comprises an air outlet 221. The second chamber is to contain a printing medium printed with a printing fluid containing the volatile compound during a curing process of the printing fluid in which the volatile compound in the printing fluid is evaporated into the air in the second chamber. The second chamber may receive and contain a printing medium in the region 280. In the example, openings into the second chamber are provided at either end of the region 280, to allow the printing medium to enter and leave the curing chamber. The curing part may be to cure a printing medium which is stationary in the region 280, or alternatively may be to cure a printing medium which is continuously moving through the region 280. The curing chamber may be to direct air (e.g. air which has entered the curing chamber through the opening 233) at a printing medium in the region 280.

In the illustrated example the air circulation system 230 comprises an air passage 232 between the air outlet 221 of the second chamber and the air inlet 211 of the first chamber. The air passage 232 may be a contained passage, e.g. comprising an enclosed duct and/or plenum. Alternatively the air passage may comprise an undefined route within the apparatus 200 along which it is possible for air to flow to get from the air outlet 221 to the air inlet 211. The air passage 232 may be substantially sealed within the apparatus, such that little or no mixing of air in the air passage with ambient air occurs during operation of the apparatus.

The air circulation system 230 of the example further comprises an air flow generator 231. The air flow generator 231 is to cause air to flow through the first chamber, subsequently through the second chamber, and along the air passage 232, such that air flowing through the first chamber at least partly comprises air exhausted from the air outlet of the second chamber. The direction of air flow in the apparatus 200 is indicated in FIG. 2 by the arrows. The air flow generator 231 may comprise any suitable air impulsion element, such as an axial fan, radial fan, motor-fan, blower, impellor, etc. In the illustrated example the air flow generator is provided within the first chamber. However; the air flow generator could alternatively be provided at any other location on a flow path of air through the apparatus. In some examples the air flow generator 231 comprises a heating element, e.g. the air flow generator 231 may comprise a fan heater. One or several operating parameters of the air flow generator 231 (e.g. speed) may be controllable, e.g. by a controller of the apparatus 200 or a controller of a printer in which the apparatus 200 is comprised.

Figure 3:
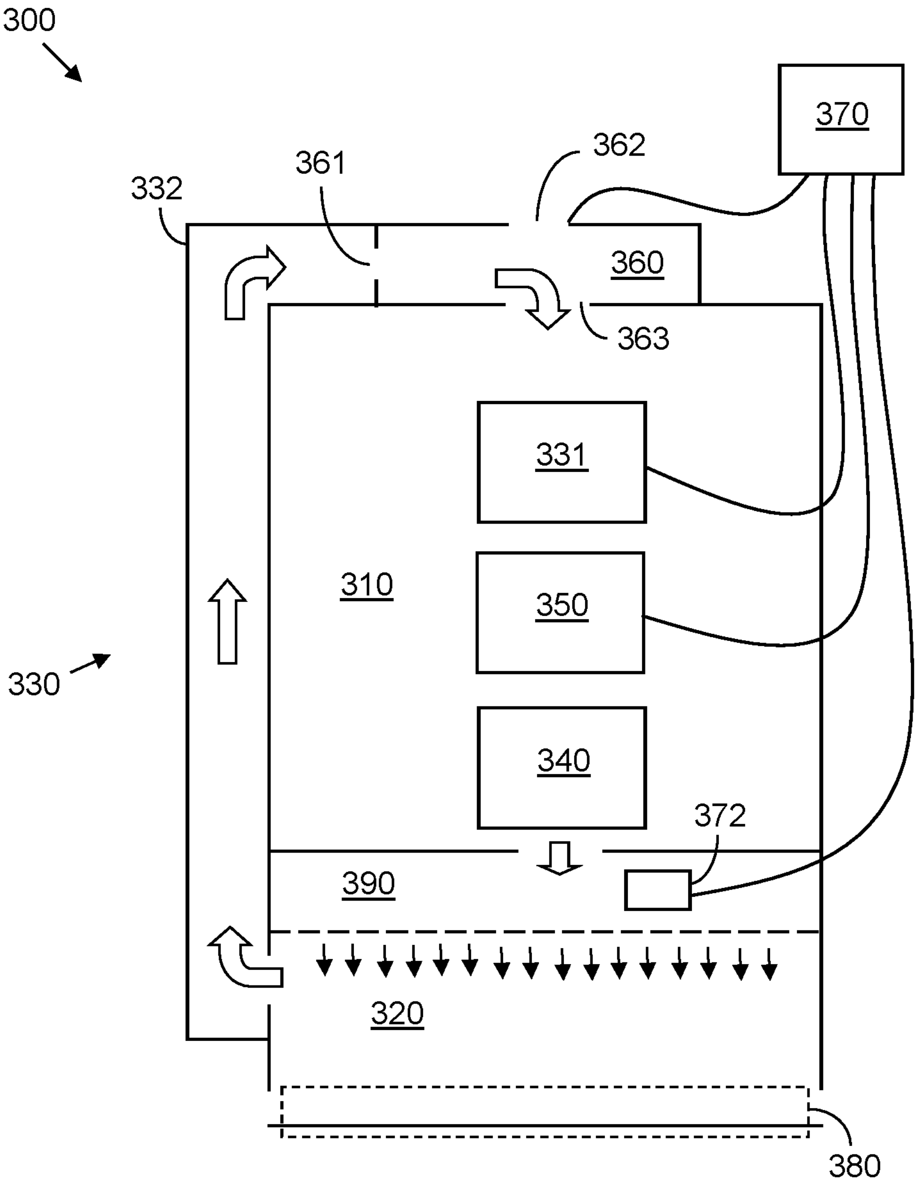
FIG. 3 schematically illustrates an apparatus according to an example.

FIG. 3 depicts an example apparatus 300. The apparatus 300 may be, e.g., a curing module of a printer. The apparatus 300 may, for example, comprise or be comprised in the curing stage 170 of the printer 100.

The apparatus 300 comprises an air treatment part 310, a curing part 320, and an air circulation system 330 which may have any or all of the features of the air treatment part 210, curing part 220 and air circulation system 230, respectively, of the apparatus 200 described above. The apparatus 300 further comprises a first chamber having an air inlet 363, a second chamber having an air outlet, an air flow generator 331, an air passage 332, an air cleaning element 340, and a region 380 for receiving a printing medium, each of which may have any or all of the features of the corresponding elements of the apparatus 200 described above with reference to FIG. 2.

The air treatment part 310 of the apparatus 300 comprises a pressure chamber 390. The air cleaning element 340 supplies cleaned air into the pressure chamber 390, under the influence of the air flow generator 331, which drives air through the air cleaning element 340. The pressure chamber 390 is to restrict the flow of air out of the pressure chamber and into the curing part 320, such that air is supplied to the curing part 320 at an elevated pressure as compared to the pressure of the air elsewhere in the apparatus. The pressure chamber 390 is in fluid communication with the second chamber of the curing part 320 via a plurality of openings distributed over a partition between the pressure chamber 390 and the second chamber. The size of the openings may be selected to achieve a desired pressure of air supplied to the curing part. The distribution of the openings may be selected to homogenize the air flow directed at the region 380, such that all parts of the region 380 receive a similar flow, e.g. in order to achieve uniform curing of printing fluid on a printing medium contained in the region 380.

The apparatus 300 further comprises an air mixing chamber 360. The air mixing chamber has a first inlet 361 for receiving air from the curing part 320. The air mixing chamber has a second inlet 362 for receiving ambient air from outside the apparatus 300. The air mixing chamber 360 also has an outlet for supplying air to the air treatment part 310. One or both of the first inlet 361 and the second inlet 362 may be provided with flow control mechanisms (e.g. adjustable dampers) for controlling the amount of air entering the air mixing chamber 360 through each respective inlet. In an example, the second inlet may be adjustable to vary the percentage by volume of ambient air comprised in the air supplied to the air treatment part 310.

In the illustrated example, the second air inlet 362 is provided with an adjustable flow control mechanism (not shown) which is connected to and is controllable by the controller 370. The controller may control the relative amounts of recirculated air (i.e. air from the curing part 320) and ambient air (i.e. air entering the mixing chamber through the air inlet 362) comprised in the air supplied to the air treatment part 310 by controlling the amount of ambient air entering the air mixing chamber (i.e. by adjusting the adjustable flow control mechanism of the second air inlet 362). The air mixing chamber may be such that air supplied to the air treatment part comprises at least 80% by volume air received from the curing part. The air mixing chamber may be such that air supplied to the air treatment part comprises at least 95% by volume air received from the curing part.

Ambient air entering through the second air inlet 362 is expected to have a lower temperature than recirculated air from the curing part 320. Therefore, the greater the proportion of ambient air comprised in the air supplied to the air treatment part 310, the greater the amount of heat energy that is to be supplied to the air in the air treatment part to heat it to a temperature sufficient for the oxidative reaction to take place in the air cleaning element 340 (and, potentially, a temperature sufficient for curing of the printing fluid). The energy efficiency of the apparatus 300 can therefore be increased by minimizing the proportion of ambient air comprised in the air supplied to the air treatment part 310.

As discussed above, in examples the air cleaning element 340 can remove all of the component from air which passes through the air cleaning element, such that air leaving the air cleaning element 340 contains none or a negligible amount of the component. As such, it is in principle possible to recirculate all of the air leaving the curing part 320 without reducing curing efficiency. However, at least in the case of VOC oxidation, removal of the component increases the amount of water vapor in the air circulating in the apparatus. It may, therefore, be advantageous to mix some ambient air with the recirculated air in order to reduce the water content of the air supplied to the curing part 320. In some examples this is achieved by continuously mixing a small amount of ambient air with the recirculated air. In alternative examples, the apparatus may operate in a full recirculation mode (in which no ambient air is mixed with the air from the curing part 320) most of the time, and may periodically operate in a mixing mode (in which some ambient air is mixed with the air from the curing part 320).

The air treatment part 310 of the apparatus 300 further comprises a heating element 350. The heating element 350 is to heat air in the air treatment part. In an example, the heating element 350 is to supply heated air to the air cleaning element 340, which may comprise, e.g., a catalytic oxidizer. The heating element 350 may comprise, for example, a heating coil which directly contacts air flowing through the air treatment part. However; any suitable air heating apparatus may alternatively be used. In the illustrated example, the heating element 350 is shown separately from the air flow generator 331. However; the heating element 350 may be integrated with the air flow generator 331, e.g. in the form of a fan heater. The apparatus 300 further comprises a controller 370, and the heating element 350 is connected in any suitable manner to the controller 370. Operating parameters of the heating element 350 may be controllable by the controller 370.

The apparatus 300 further comprises a temperature control system to detect a temperature of air flowing out of the air treatment part 310 or into the curing part 320. The temperature control system may be to control operation of the heating element 350 in dependence on the detected temperature. To enable temperature detection, the apparatus 300 comprises a temperature sensor 372. In the illustrated example, the temperature sensor 372 is located within the pressure chamber 390. However; the temperature sensor 372 may alternatively be positioned at or near an outlet of the air cleaning element 340, or in the second chamber of the curing part 320. In the illustrated example the temperature sensor 372 is connected, in any suitable manner, to the controller 370, and the temperature control system is implemented by the controller 370. In alternative examples a dedicated temperature controller is provided, which may be connected to the temperature sensor 372 and one or both of the heating element and the air flow generator, but not to any other components.

As discussed above, the VOC oxidation reaction is exothermic. In an example in which the air cleaning element comprises a catalytic oxidizer, the air cleaning element 340 may therefore be considered as a heat source for heating air supplied to the curing part 320. However; it is difficult to control the amount of heat generated by a catalytic oxidizer, and also the air is to have a certain minimum air temperature in order for the oxidation reaction to take place. As such, an example temperature control system which includes a controllable heating element is advantageous. Such a temperature control system may also include a controllable cooling element. A controllable air flow generator (e.g. the air flow generator 331) may be considered to be a controllable cooling element. A controllable air inlet for permitting ambient air to enter the apparatus (e.g. the air inlet 362) may be considered to be a controllable cooling element.

In the illustrated example, air in the air treatment part 310 is heated by the heating element 350 before being supplied to the air cleaning element 340. Air downstream of the air cleaning element 340 has therefore received a first amount of heating from the heating element 350 and a second amount of heating from the air cleaning element 340 (i.e. as a result of an exothermic oxidation reaction taking place in the air cleaning element 340). The temperature sensor 372 detects the temperature of the air immediately downstream of the air cleaning element 340. The air temperature detected by the temperature sensor 372 is substantially equal to the temperature of the air to which the printing medium is exposed in the curing part.

The temperature control system may be to maintain the air supplied to the region 380 at a preselected temperature, e.g. chosen based on considerations relating to a particular combination of a given printing fluid and a given printing medium. The temperature control system may be to maintain the air supplied to the region 380 within a preselected temperature range.

In an example, the temperature control system determines whether a detected temperature of air flowing out of the air treatment part 310 or into the curing part 320 (e.g. the temperature detected by the temperature sensor 372) meets a predefined criterion (e.g. is equal to a predefined value, or is within a predefined range).

The temperature control system may determine that the detected temperature is too high (e.g. it is greater than a predefined value, or greater than the upper limit of a predefined range). In some examples the temperature control system is to, responsive to determining that the detected temperature is too high, deactivate the heating element 350. In some examples, the temperature control system is to determine the operation state of the heating element 350. In such examples the temperature control system may, responsive to determining that the detected temperature is too high and determining that the heating element 350 is inactive, activate a cooling element. In the illustrated example, activating a cooling element may comprise increasing the speed of an air flow generator, to increase the flow rate of air flowing through the apparatus. In the illustrated example, activating a cooling element may comprise adjusting a controllable ambient air inlet to increase the amount of ambient air entering the apparatus 300.

The temperature control system may determine that the detected temperature is too low (e.g. it is less than a predefined value, or less than the lower limit of a predefined range). In some examples the temperature control system is to, responsive to determining that the detected temperature is too low, activate the heating element 350 (activating the heating element 350 may comprise, e.g., switching on the heating element 350, and/or increasing an operating temperature of the heating element 350). In some examples, the temperature control system is to determine the operation state of the heating element 350. In such examples the temperature control system may, responsive to determining that the detected temperature is too high and determining that the heating element 350 is operating at a maximum level, deactivate a cooling element. In the illustrated example, deactivating a cooling element may comprise reducing the speed of an air flow generator, to reduce the flow rate of air flowing through the apparatus. In the example, deactivating a cooling element may comprise adjusting a controllable ambient air inlet to decrease the amount of ambient air entering the apparatus 300.

In many situations it may be possible to achieve a desired temperature change of the air supplied to the curing part using any one of multiple suitable combinations of operating parameters/states of the heating element 350, the air flow generator 331, and/or the mixing chamber 360. Therefore, in some examples the temperature control system may select operational parameters of the heating element 350, the air flow generator 331, and/or the mixing chamber 360 in order to optimize a preselected measure, such as energy efficiency, curing efficiency, etc.

The controller 370 may be implemented by a controller of a printer in which the apparatus 300 is comprised, e.g. the printer 100. Alternatively, the controller 370 may be separate from a controller of a printer in which the apparatus 300 is comprised. In some examples the controller 370 is provided in communication with the controller of a printer in which the apparatus 300 is comprised. The controller 370 may be implemented in the form of machine-readable instructions executable on a processor such as a central processing unit of the apparatus 300 or a central processing unit of a printer in which the apparatus 300 is comprised. The machine-readable instructions may be made available on any suitable computer-readable medium.

In the illustrated example, the air flow generator 331 is provided upstream of the heating element 350, which is in turn upstream of the air cleaning element 340. It has been found that examples which utilize this particular arrangement of an air flow generator, heating element and air cleaning element may be particularly energy efficient. For example, providing the heating element immediately upstream of the air cleaning element may minimize the amount of heat energy that is to be applied before the air entering the air cleaning element is hot enough for an oxidation reaction to occur. However; examples which use alternative arrangements are possible.

Figure 4:
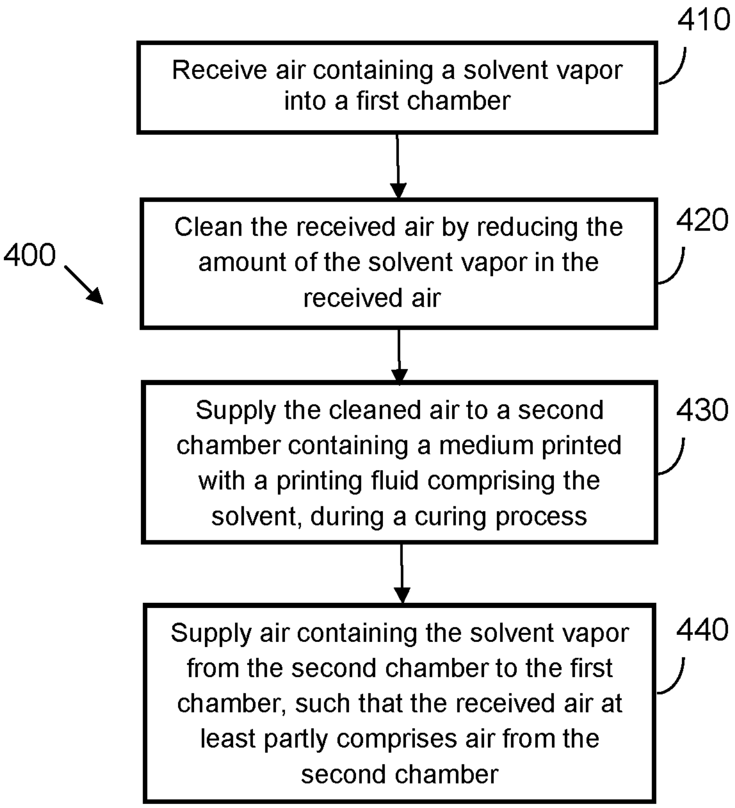
FIG. 4 is a flowchart of a method according to an example.
Figure 5:
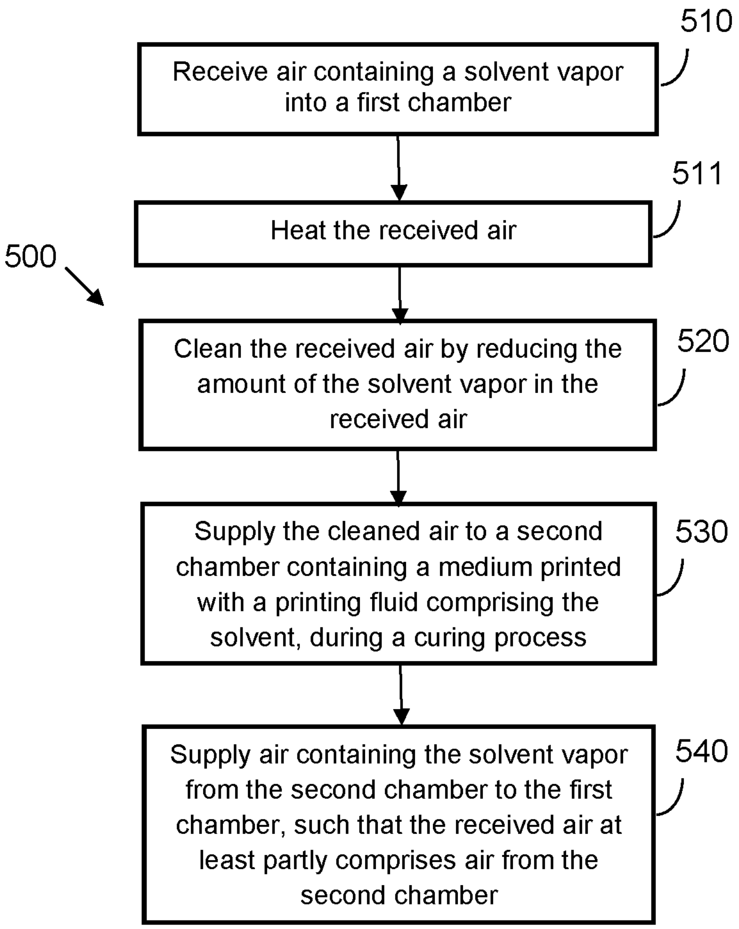
FIG. 5 is a flowchart of a method according to an example.

FIGS. 4 and 5 are flowcharts that implement examples of methods for curing a latex printing fluid printed on a printing medium. In discussing FIGS. 4 and 5 reference is made to the diagrams of FIGS. 1-3 to provide contextual examples. Implementation, however, is not limited to those examples.

FIG. 4 illustrates an example method, e.g. of curing a solvent-based latex printing fluid printed on a printing medium. In block 410, air containing a solvent vapor is received into a first chamber. The solvent vapor may be a component as referred to in the above discussions of the apparatus 200 and the apparatus 300, and may have any or all of the features described above in relation to the component. The solvent vapor may be a gaseous phase of a solvent comprised in a printing fluid. The first chamber may be comprised in an air treatment part of an apparatus, e.g. the apparatus 200 or the apparatus 300. The first chamber may have any or all of the features of the first chamber of the air treatment part 210 or the air treatment part 310. The air may be received into the first chamber through an air inlet of the first chamber, which may be connected, via an air passage, to a second chamber in which a curing process occurs. The received air may comprise recirculated air originating from the second chamber, ambient air from a region external to an apparatus implementing the method, or a mixture of recirculated air and ambient air in any proportion.

In block 420 the received air is cleaned by reducing the amount of the solvent vapor in the received air. Block 420 may be implemented, for example, by an air cleaning element which may have any or all of the features of the air cleaning element 240 or the air cleaning element 340 described above. For example, reducing the amount of the solvent vapor in the received air may comprise removing all or substantially all of the solvent vapor from the received air, such that on completion of block 420 the received air which has been cleaned comprises none or a negligible amount of the solvent vapor.

In block 430 the cleaned air is supplied to the second chamber in which the curing process occurs. The second chamber may have any or all of the features of the second chamber of the apparatus 200, or the second chamber of the apparatus 300, described above. The second chamber contains a medium printed with a printing fluid comprising the solvent. The cleaned air is supplied to the second chamber during a curing process of the printing fluid in which the solvent is vaporized from the printing fluid into air in the second chamber. Thus, upon completion of block 430 the air in the second chamber contains solvent vapor.

The cleaned air may be supplied at a preselected temperature, which has been selected based on characteristics of the printing fluid and/or the medium. The preselected temperature may be high enough to vaporize all or nearly all of the solvent comprised in the printing fluid within a given time period. The preselected temperature may be sufficient to melt all or nearly all of the latex comprised in the printing fluid within a given time period. The cleaned air may be supplied to the second chamber under the influence of an air flow generator, e.g. the air flow generator 231 or the air flow generator 331. Cleaned air may be supplied to the second chamber at an elevated pressure. Cleaned air may enter the second chamber at multiple locations, e.g. through multiple openings in a partition between the first chamber and the second chamber. Cleaned air may be supplied to the second chamber in any of the ways described above in relation to the apparatus 200 or the apparatus 300.

In block 440 air containing solvent vapor (i.e. which has been vaporized out of the printing fluid during the curing process) is supplied from the second chamber to the first chamber, such that the received air (i.e. the air received by the first chamber in block 410) at least partly comprises air from the second chamber. Thus, the solvent vapor comprised in the received air is present as a result of the curing process which occurred in the second chamber. The received air becomes cleaned air which is supplied to the second chamber, and this air from the second chamber is subsequently supplied to the first chamber to become received air, in a continuous cycle. The air containing solvent vapor may be supplied from the second chamber to the first chamber along an air passage, e.g. the air passage 332. The air containing solvent vapor may be supplied from the second chamber to the first chamber in any of the ways described above in relation to the apparatus 200 or the apparatus 300.

Supplying air containing the solvent vapor from the second chamber to the first chamber may comprise mixing air from the second chamber with ambient air not containing the solvent vapor, e.g. in a mixing chamber such as the mixing chamber 360. Mixing of air from the second chamber with ambient air may be performed in any of the ways described above in relation to the apparatus 300.

FIG. 5 illustrates a further example method, e.g. of curing a solvent-based latex printing fluid printed on a printing medium. Blocks 510, 520, 530 and 540 correspond respectively to blocks 410, 420, 430 and 440 of the method of FIG. 4, and may be performed as described above in relation to FIG. 4.

The method of FIG. 5 further comprises block 511. In block 511, the received air is heated, e.g. using a heating element such as the heating element 350. Heating of the received air may be controlled in dependence on the temperature of the air supplied to the second chamber. Block 511 may be performed before block 520, such that the received air is heated before it is cleaned. Heating the received air may be performed in any of the ways described above in relation to FIG. 3.

Although the flow diagrams in FIGS. 4 and 5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are contemplated.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transitions.

What is claimed is:

1. An apparatus, comprising:

an air treatment part to reduce the amount of a component comprised in air in the air treatment part and to supply treated air to a curing part, the air treatment part comprising a catalytic oxidizer to oxidize the component;

the curing part to receive treated air from the air treatment part and to expose an item printed with a printing fluid comprising the component to the received treated air;

an air circulation system to cause the treated air to flow from the air treatment part into the curing part and to cause air from the curing part to flow into the air treatment part; and a temperature control system to detect a temperature of air flowing out of the air treatment part or into the curing part and to control operation of a heating element in dependence on the detected temperature.

2. An apparatus in accordance with claim 1, wherein the heating element heats air in the air treatment part and supplies heated air to the catalytic oxidizer.

3. An apparatus in accordance with claim 1, the component being a volatile organic compound.

4. An apparatus in accordance with claim 1, the catalytic oxidizer to expose the air to a surface of catalytic material.

5. An apparatus in accordance with claim 1, the catalytic oxidizer including a honeycomb structure coated with a catalytic material.

6. A curing module for a printer, the curing module comprising:

a first chamber comprising an air inlet and an air cleaning element to reduce the amount of a volatile compound comprised in air in the first chamber by oxidizing the volatile compound with a catalytic oxidizer;

a second chamber in fluid communication with the first chamber, the second chamber comprising an air outlet, the second chamber being to contain a medium printed with a printing fluid comprising the volatile compound during a curing process of the printing fluid in which the volatile compound in the printing fluid is evaporated into the air in the second chamber;

an air passage to enable air to flow from the air outlet of the second chamber to the air inlet of the first chamber;

an air flow generator to cause air to flow through the first chamber, subsequently through the second chamber, and along the air passage, such that air flowing through the first chamber at least partly comprises air exhausted from the air outlet of the second chamber; and a temperature control system to detect a temperature of air flowing out of the first chamber or into the second chamber and to control operation of a heating element in dependence on the detected temperature.

7. The curing module of claim 6, wherein the heating element heats the air in the first chamber and supplies heated air to the catalytic oxidizer.

8. The curing module of claim 6, the catalytic oxidizer to oxidize the volatile compound by exposing the air to a surface of catalytic material.

9. The curing module of claim 6, the catalytic oxidizer including a honeycomb structure coated with a catalytic material.

10. A method, comprising:

receiving air containing a solvent vapor into a first chamber;

cleaning the received air by reducing the amount of the solvent vapor in the received air with a catalytic oxidizer;

supplying the cleaned air to a second chamber containing a medium printed with a printing fluid comprising the solvent, during a curing process of the printing fluid in which the solvent is vaporized from the printing fluid into air in the second chamber;

supplying air containing the solvent vapor from the second chamber to the first chamber, such that the received air at least partly comprises air from the second chamber; and detecting a temperature of air flowing out of the first chamber or into the second chamber and to control operation of the heating element in dependence on the detected temperature.

11. The method of claim 10, wherein heating the received air with the heating element supplies heated air to the catalytic oxidizer.

12. The method of claim 10, further comprising:

cleaning the received air by exposing the air to a surface of catalytic material.

* * * * *